US012723127B2

(12) United States Patent
Laas et al.

(10) Patent No.: US 12,723,127 B2
(45) Date of Patent: Sep. 1, 2026

(54) HYDROPHILICALLY MODIFIED POLYISOCYANATES COMPRISING SILANE AND THIOALLOPHANATE STRUCTURES

(71) Applicant: Covestro Deutschland AG, Leverkusen (DE)

(72) Inventors: Hans-Josef Laas, Odenthal (DE); Thomas Fait, Cologne (DE); Joerg Buechner, Bergisch Gladbach (DE)

(73) Assignee: Covestro Deutschland AG, Leverkusen (DE)

( * ) Notice: Subject to any disclaimer, the term of this patent is extended or adjusted under 35 U.S.C. 154(b) by 175 days.

(21) Appl. No.: 18/576,849

(22) PCT Filed: Jul. 6, 2022

(86) PCT No.: PCT/EP2022/068749

§ 371 (c)(1),
(2) Date: Jan. 5, 2024

(87) PCT Pub. No.: WO2023/280921

PCT Pub. Date: Jan. 12, 2023

(65) Prior Publication Data

US 2024/0336721 A1 Oct. 10, 2024

(30) Foreign Application Priority Data

Jul. 7, 2021 (EP) .................................... 21184252

(51) Int. Cl.

| | |
|---|---|
| ***B32B 37/12*** | (2006.01) |
| ***B32B 7/12*** | (2006.01) |
| ***C08G 18/28*** | (2006.01) |
| ***C08G 18/38*** | (2006.01) |
| ***C08G 18/48*** | (2006.01) |
| ***C08G 18/77*** | (2006.01) |
| ***C08G 18/80*** | (2006.01) |
| ***C09D 175/04*** | (2006.01) |
| ***C09J 5/00*** | (2006.01) |
| ***C09J 175/04*** | (2006.01) |

(52) U.S. Cl.

CPC .............. *C08G 18/809* (2013.01); *B32B 7/12* (2013.01); *C08G 18/288* (2013.01); *C08G 18/3857* (2013.01); *C08G 18/4833* (2013.01); *C08G 18/775* (2013.01); *C09D 175/04* (2013.01); *C09J 5/00* (2013.01); *C09J 175/04* (2013.01); *B32B 2037/1276* (2013.01); *B32B 2255/06* (2013.01); *B32B 2255/26* (2013.01); *C09J 2475/00* (2013.01)

(58) Field of Classification Search

CPC ........... B32B 7/12; B32B 15/08; B32B 15/12; B32B 15/20; B32B 2037/1276; C08G 18/0828; C08G 18/10; C08G 18/283; C08G 18/288; C08G 18/289; C08G 18/3855; C08G 18/3857; C08G 18/48; C08G 18/4825; C08G 18/4833; C08G 18/5072; C08G 18/5075; C08G 18/5081; C08G 18/5084; C08G 18/706; C08G 18/721; C08G 18/725; C08G 18/771; C08G 18/775; C08G 18/776; C08G 18/778; C08G 18/7818; C08G 18/7837; C08G 2170/80; C09D 175/04; C09J 175/00; C09J 175/04; C09J 175/08; C09J 175/12

See application file for complete search history.

(56) References Cited

U.S. PATENT DOCUMENTS

| | | | |
|---|---|---|---|
| 3,769,318 | A | 10/1973 | Windemuth et al. |
| 4,160,080 | A | 7/1979 | Koenig et al. |
| 4,663,377 | A | 5/1987 | Hombach et al. |
| 5,252,696 | A | 10/1993 | Laas et al. |
| 5,387,367 | A | 2/1995 | Haeberle et al. |
| 5,854,338 | A | 12/1998 | Hovestadt et al. |

(Continued)

FOREIGN PATENT DOCUMENTS

| | | | |
|---|---|---|---|
| EP | 0000194 | A1 | 1/1979 |
| EP | 0206059 | A2 | 12/1986 |

(Continued)

OTHER PUBLICATIONS

Liebigs, Mono- und Polyisocyanate, Annalen Der Chemie, 1949, pp. 75-136, vol. 562.

(Continued)

*Primary Examiner* — Michael A Tolin

(74) *Attorney, Agent, or Firm* — The Webb Law Firm

(57) ABSTRACT

A hydrophilic polyisocyanate composition includes a polyisocyanate component A) and an emulsifier component B. The polyisocyanate component A) consists of at least one polyisocyanate, including silane and thioallophanate structures, of general formula (I), in which R1, R2 and R3 represent identical or different functional groups and each denote a saturated or unsaturated, linear or branched, aliphatic or cyclo-aliphatic or optionally substituted aromatic or araliphatic functional group having up to 18 carbon atoms, which functional group can optionally also contain up to 3 heteroatoms from the series oxygen, sulfur and nitrogen, X represents a linear or branched organic functional group having at least 2 carbon atoms, Y represents a linear or branched, aliphatic or cycloaliphatic, araliphatic or aromatic functional group having up to 18 carbon atoms, and n represents an integer from 1 to 20, and the emulsifier component B) contains at least one ionic and/or nonionic emulsifier.

18 Claims, No Drawings

(56) References Cited

U.S. PATENT DOCUMENTS

| | | | |
|---|---|---|---|
| 5,866,657 A | 2/1999 | Tominaga et al. | |
| 6,057,415 A | 5/2000 | Roesler et al. | |
| 6,221,995 B1 * | 4/2001 | Yukio | C08G 18/6254 528/30 |
| 6,426,414 B1 | 7/2002 | Laas et al. | |
| 6,767,958 B2 | 7/2004 | Laas et al. | |
| 10,179,830 B2 | 1/2019 | Laas et al. | |
| 2005/0137374 A1 | 6/2005 | Roesler et al. | |
| 2007/0104962 A1 * | 5/2007 | Laas | C09D 175/04 525/453 |
| 2012/0041142 A1 | 2/2012 | Nennemann et al. | |
| 2017/0121450 A1 * | 5/2017 | Laas | C08G 18/289 |
| 2018/0155574 A1 * | 6/2018 | Laas | C08G 18/7837 |

FOREIGN PATENT DOCUMENTS

| | | |
|---|---|---|
| EP | 0486881 A2 | 5/1992 |
| EP | 0540985 A1 | 5/1993 |
| EP | 0649866 A1 | 4/1995 |
| EP | 0842991 A1 | 5/1998 |
| EP | 0872499 A1 | 10/1998 |
| EP | 0949284 A1 | 10/1999 |
| EP | 0953585 A1 | 11/1999 |
| EP | 0959087 A1 | 11/1999 |
| EP | 1544226 A2 | 6/2005 |
| EP | 2414419 B1 | 10/2014 |
| GB | 994890 | 6/1965 |
| WO | 9731960 A1 | 9/1997 |
| WO | 0188006 A1 | 11/2001 |
| WO | 2005047357 A2 | 5/2005 |
| WO | 2015189164 A1 | 12/2015 |

OTHER PUBLICATIONS

Maasen et al., Ullmanns Encyklopadie der technischen Chemie, 1984, pp. 31-38, vol. 19, 4th edition.

* cited by examiner

HYDROPHILICALLY MODIFIED POLYISOCYANATES COMPRISING SILANE AND THIOALLOPHANATE STRUCTURES

CROSS-REFERENCE TO RELATED APPLICATIONS

This application is the United States national phase of International Application No. PCT/EP2022/068749 filed Jul. 6, 2022, and claims priority to European Patent Application No. 21184252.1 filed Jul. 7, 2021, the disclosures of which are hereby incorporated by reference in their entireties.

BACKGROUND

Technical Field

The invention relates to hydrophilically modified polyisocyanates having silane and thioallophanate structures, to a process for the preparation thereof and to the use thereof for the production of polyurethane plastics. In addition, the invention relates to coating compositions comprising the hydrophilically modified polyisocyanates having silane and thioallophanate structures, and to the substrates coated and adhesively bonded with these coating compositions.

Description of Related Art

Hydrophilically modified polyisocyanates having silane groups and the use thereof as crosslinker components in aqueous two-component systems are known.

EP 872 499 describes aqueous two-component binder combinations based on hydroxy- and/or amino-functional water-dilutable resins, and, as crosslinkers, compounds having isocyanate and alkoxysilyl groups obtained by partial reaction of polyisocyanates with aminoalkylalkoxysilanes. These two-component systems are used as binders in paints, coatings and sealants. The emulsifiability of the crosslinker components having isocyanate and alkoxysilyl groups in the aqueous binder is achieved by mixing with a hydrophilically modified polyisocyanate.

EP 949 284 discloses hydrophilically modified polyisocyanates having a defined content of isocyanate and alkoxysilane groups, prepared by reacting polyisocyanates with secondary aminoalkylalkoxysilanes and hydrophilic nonionic or ionic formation components which enable the polyisocyanates modified in this way to be stably dispersed in water. These hydrophilic alkoxysilane-modified polyisocyanates serve as crosslinker components for aqueous dispersions of isocyanate-reactive polymers for the production of coating compositions, adhesives or sealants.

EP 1 544 226 describes aqueous two-component adhesives consisting of reaction products of polyisocyanates with substoichiometric amounts of alkoxysilane-functional aspartic esters and polyalkylene oxide polyether alcohols, and as a second component consisting of a catalyst and/or an aqueous binder. The adhesives serve in particular for the adhesive bonding of canvas or plastics to substrates, such as wood, metals, preferably iron or aluminum, plastics, paper, canvas, ceramic, stone, glass or concrete.

EP 2 414 419 provides dispersions of inorganic, optionally surface-modified nanoparticles in hydrophilized polyisocyanates modified with substoichiometric amounts of alkoxysilanes that are reactive toward NCO groups, and the use thereof as crosslinkers for highly scratch-resistant coatings. The alkoxysilane modification of the polyisocyanate serves for compatibilization.

EP 842 991 describes primers for adhesives and sealants, comprising reaction products of polyisocyanates with emulsifiers that are reactive toward isocyanate groups, for example hydroxy-functional polyethylene oxide monoalkyl ethers and monoalkyl aryl ethers, and silane-functional compounds bearing groups toward isocyanates, in particular mercaptoalkylsilanes, in combination with aqueous binders having a core-shell structure.

EP 953 585 provides water-emulsifiable polyisocyanates that are similar to the products of EP 842 991. They are prepared by reacting hydrophobic polyisocyanates, preferably polyisocyanurate polyisocyanates, with preferably mercaptosilanes as coupling agents and nonionic emulsifiers that are reactive toward NCO groups and have a defined HLB value, in particular alkylphenol-initiated polyether alcohols. These water-emulsifiable polyisocyanates, which may optionally additionally comprise 3-glycidoxypropyltrimethoxysilane, serve inter alia as crosslinkers for aqueous adhesives. Under the reaction conditions specified for the preparation of the silane-functional polyisocyanates, at temperatures of 50° C. to 90° C. and without the additional use of a catalyst, mercaptosilanes react exclusively to form thiourethane groups; thioallophanate structures do not form. This also applies to the products obtainable by the process of EP 842 991.

The known hydrophilically modified polyisocyanates having silane groups from the prior art are used, for example, to improve the scratch resistance of aqueous paint systems or to increase the bond strength of adhesive bonds, however they are unable meet all practical requirements. For example, they are of only very limited suitability, if at all, as crosslinker components for adhesive dispersions intended for the production of multilayer composites having very high heat resistance and bond strength, such as those required for example for the hot sterilization of packaged food or for the filling of hot food.

As has now surprisingly been found, the use of novel hydrophilically modified polyisocyanates having silane and thioallophanate structures in combination with aqueous adhesive dispersions makes it possible to formulate two-component polyurethane dispersion adhesives for multilayer composites with at least one metal foil whose composite adhesion is not only maintained under the conditions of steam sterilization but even improved significantly. This was particularly surprisingly since, on account of the starting polyisocyanates which are strictly difunctional with regard to isocyanate functionality, the novel hydrophilic polyisocyanates having silane and thioallophanate structures in some cases have significantly lower isocyanate functionalities after hydrophilization than the hydrophilically-modified polyisocyanates having silane groups that are known to date.

SUMMARY

The present invention provides hydrophilic polyisocyanate compositions comprising a polyisocyanate component A) and an emulsifier component B), characterized in that the polyisocyanate component A) consists of at least one polyisocyanate having silane and thioallophanate structures of the general formula (I)

(I)

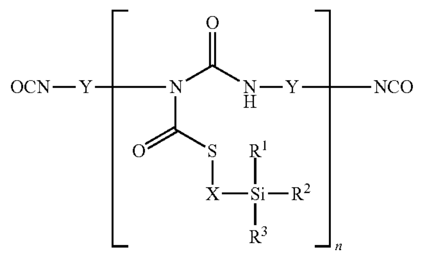

in which $R^1$, $R^2$ and $R^3$ are identical or different radicals and are each a saturated or unsaturated, linear or branched, aliphatic or cycloaliphatic or an optionally substituted aromatic or araliphatic radical having up to 18 carbon atoms, which may optionally contain up to 3 heteroatoms from the series of oxygen, sulfur and nitrogen, X is a linear or branched organic radical having at least 2 carbon atoms, Y is a linear or branched, aliphatic or cycloaliphatic, an araliphatic or aromatic radical having up to 18 carbon atoms and n is an integer from 1 to 20, and the emulsifier component B) comprises at least one ionic and/or nonionic emulsifier.

The invention also provides a process for the preparation of these hydrophilic polyisocyanate compositions and the use thereof for the production of polyurethane plastics.

DESCRIPTION

Thioallophanate polyisocyanates A) containing silane groups are known and described for example in WO 2015/189164. Said polyisocyanates are in particular those of the general formula (I)

(I)

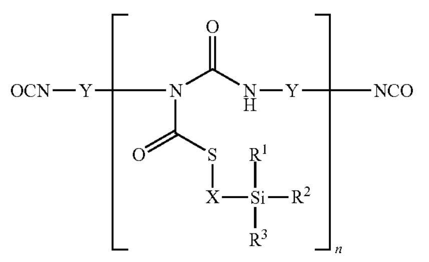

in which $R^1$, $R^2$ and $R^3$ are identical or different radicals and are each a saturated or unsaturated, linear or branched, aliphatic or cycloaliphatic or an optionally substituted aromatic or araliphatic radical having up to 18 carbon atoms, which may optionally contain up to 3 heteroatoms from the series of oxygen, sulfur and nitrogen, X is a linear or branched organic radical having at least 2 carbon atoms, Y is a linear or branched, aliphatic or cycloaliphatic, an araliphatic or aromatic radical having up to 18 carbon atoms and n is an integer from 1 to 20.

The preparation of such thioallophanates containing silane groups is likewise known and not a subject of this application. It is effected by reacting C) at least one monomeric diisocyanate of the general formula (II)

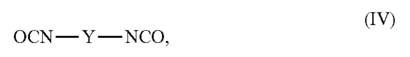

(IV)

in which Y is a linear or branched, aliphatic or cycloaliphatic, an araliphatic or aromatic radical having up to 18 carbon atoms, with D) mercaptosilanes of the general formula (III)

(III)

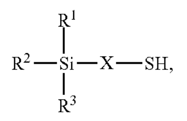

in which $R^1$, $R^2$, $R^3$ and X have the definition given above, in an equivalents ratio of isocyanate groups to mercapto groups of 2:1 to 40:1.

Suitable starting compounds C) for preparing the thioallophanate polyisocyanates A) containing silane groups are any desired diisocyanates having aliphatically, cycloaliphatically, araliphatically and/or aromatically bonded isocyanate groups, which may be prepared by any desired processes, for example by phosgenation or by a phosgene-free route, for example by means of urethane cleavage.

Suitable diisocyanates are, for example, those of the general formula (II)

OCN—Y—NCO, (IV)

in which Y is a linear or branched, aliphatic or cycloaliphatic radical having up to 18 carbon atoms, preferably 4 to 18 carbon atoms, or an optionally substituted aromatic or araliphatic radical having up to 18 carbon atoms, preferably 6 to 18 carbon atoms, such as 1,4-diisocyanatobutane, 1,5-diisocyanatopentane, 1,6-diisocyanatohexane (HDI), 1,5-diisocyanato-2,2-dimethylpentane, 2,2,4- or 2,4,4-trimethyl-1,6-diisocyanatohexane, 1,8-diisocyanatooctane, 1,9-diisocyanatononane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4 (3)-isocyanatomethylcyclohexane, 2,4'- and 4,4'-diisocyanatodicyclohexylmethane ($H_{12}$-MDI), 1,3- and 1,4-bis(isocyanatomethyl)cyclohexane, 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi (cyclohexyl), 4,4'-diisocyanato-3,3'-dimethyl-1,1'-bi (cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis(isocyanatomethyl)benzene (xylylene diisocyanate, XDI), 1,3- and 1,4-bis(1-isocyanato-1-methylethyl)benzene (TMXDI), bis(4-(1-isocyanato-1-methylethyl)phenyl) carbonate, phenylene 1,3- and 1,4-diisocyanate, tolylene 2,4- and 2,6-diisocyanate and any desired mixtures of these isomers, diphenylmethane 2,4'- and/or 4,4'-diisocyanate and naphthylene 1,5-diisocyanate and any desired mixtures of such diisocyanates. Further diisocyanates which are likewise suitable can be found, furthermore, for example, in Justus Liebigs Annalen der Chemie Volume 562 (1949) pp. 75-136.

Particularly preferred as starting component C) are diisocyanates of the general formula (II) in which Y is a linear or branched, aliphatic or cycloaliphatic radical having 5 to 13 carbon atoms.

Very particularly preferred starting components C) are 1,5-diisocyanatopentane, 1,6-diisocyanatohexane, 1-isocyanato-3,3,5-trimethyl-5-isocyanatomethylcyclohexane, 2,4'- and/or 4,4'-diisocyanatodicyclohexylmethane or any desired mixtures of these diisocyanates.

Starting components D) for the preparation of the polyisocyanates A) having silane and thioallophanate structures are any desired mercaptosilanes of the general formula (III)

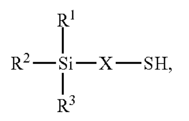

(III)

in which $R^1$, $R^2$ and $R^3$ are identical or different radicals and are each a saturated or unsaturated, linear or branched, aliphatic or cycloaliphatic or an optionally substituted aromatic or araliphatic radical having up to 18 carbon atoms, which may optionally contain up to 3 heteroatoms from the series of oxygen, sulfur and nitrogen, and X is a linear or branched organic radical having at least 2 carbon atoms.

Suitable mercaptosilanes D) are for example 2-mercaptoethyltrimethylsilane, 2-mercaptoethylmethyldimethoxysilane, 2-mercaptoethyltrimethoxysilane, 2-mercaptoethyltriethoxysilane, 3-mercaptopropylmethyldimethoxysilane, 3-mercaptopropyldimethylmethoxysilane, 3-mercaptopropylmethyldiethoxysilane, 3-mercaptopropylethyldimethoxysilane, 3-mercaptobutyltrimethoxysilane, 3-mercaptopropyltrimethoxysilane, 3-mercaptopropyltriethoxysilane, and/or 4-mercaptobutyltrimethoxysilane.

Preferred mercaptosilanes D) for the preparation of the polyisocyanates A) having silane and thioallophanate structures are those of the general formula (III) in which $R^1$, $R^2$ and $R^3$ are identical or different radicals and are each a saturated, linear or branched, aliphatic or cycloaliphatic radical having up to 6 carbon atoms, which may optionally contain up to 3 oxygen atoms, and X is a linear or branched alkylene radical having 2 to 10 carbon atoms.

Particularly preferred mercaptosilanes D) are those of the general formula (III) in which $R^1$, $R^2$ and $R^3$ are each alkyl radicals having up to 6 carbon atoms and/or alkoxy radicals containing up to 3 oxygen atoms, with the proviso that at least one of the radicals $R^1$, $R^2$ and $R^3$ is such an alkoxy radical, and X is a propylene radical ($—CH_2—CH_2—CH_2—$).

Very particularly preferred mercaptosilanes D) are those of the general formula (III) in which $R^1$, $R^2$ and $R^3$ are identical or different radicals and are each methyl, methoxy or ethoxy, with the proviso that at least one of the radicals $R^1$, $R^2$ and $R^3$ is a methoxy or ethoxy radical, and X is a propylene radical ($—CH_2—CH_2—CH_2—$).

For the preparation of the polyisocyanates A) having silane and thioallophanate structures, the diisocyanates (C) are reacted with the mercaptosilanes D) at temperatures of 20° C. to 200° C., preferably 40° C. to 160° C., observing an equivalents ratio of isocyanate groups to mercapto groups of 2:1 to 40:1, preferably of 4:1 to 30:1, particularly preferably 6:1 to 20:1, to give thioallophanates.

This can be carried out uncatalyzed, as a thermally induced thioallophanatization. Preferably, however, suitable catalysts are used for accelerating the thioallophanatization reaction. These are the customary, known allophanatization catalysts, examples being metal carboxylates, metal chelates or tertiary amines of the type described in GB-A-0 994 890, alkylating agents of the type described in U.S. Pat. No. 3,769,318, or strong acids, as described for example in EP-A-0 000 194.

Suitable allophanatization catalysts are in particular zinc compounds, such as zinc (II) stearate, zinc (II) n-octanoate, zinc (II) 2-ethyl-1-hexanoate, zinc (II) naphthenate or zinc (II) acetylacetonate, tin compounds, such as tin (II) n-octanoate, tin (II) 2-ethyl-1-hexanoate, tin (II) laurate, dibutyltin oxide, dibutyltin dichloride, dibutyltin diacetate, dibutyltin dilaurate, dibutyltin dimaleate or dioctyltin diacetate, zirconium compounds, such as zirconium (IV) 2-ethyl-1-hexanoate, zirconium (IV) neodecanoate, zirconium (IV) naphthenate or zirconium (IV) acetylacetonate, aluminum tri(ethylacetoacetate), iron (III) chloride, potassium octoate, manganese compounds, cobalt compounds or nickel compounds, and strong acids, such as trifluoroacetic acid, sulfuric acid, hydrogen chloride, hydrogen bromide, phosphoric acid or perchloric acid, or any desired mixtures of these catalysts.

Also suitable, albeit less preferred, catalysts for the preparation of the polyisocyanates A) having silane and thioallophanate structures are those compounds which in addition to the allophanatization reaction also catalyze the trimerization of isocyanate groups to form isocyanurate structures. Such catalysts are described for example in EP-A 0 649 866 page 4, line 7 to page 5, line 15.

Preferred catalysts for the preparation of the polyisocyanates A) having silane and thioallophanate structures are zinc compounds and/or zirconium compounds of the above-mentioned type. Very particularly preferred is the use of zinc(II) n-octanoate, zinc(II) 2-ethyl-1-hexanoate and/or zinc(II) stearate, zirconium(IV) n-octanoate, zirconium(IV) 2-ethyl-1-hexanoate and/or zirconium(IV) neodecanoate.

These catalysts are used, if at all, in an amount of 0.001% to 5% by weight, preferably 0.005% to 1% by weight, based on the total weight of the coreactants C) and D), and may be added either before the beginning of the reaction or at any time during the reaction.

The thioallophanatization is preferably carried out without a solvent. If desired, however, suitable solvents that are inert toward the reactive groups of the starting components can also additionally be used. Suitable solvents are for example the customary paint solvents which are known per se, such as ethyl acetate, butyl acetate, ethylene glycol monomethyl or monoethyl ether acetate, 1-methoxy-2-propyl acetate, 3-methoxy-n-butyl acetate, acetone, 2-butanone, 4-methyl-2-pentanone, cyclohexanone, toluene, xylene, chlorobenzene, white spirit, relatively highly substituted aromatics, such as those commercialized for example under the names solvent naphtha, Solvesso®, Isopar®, Nappar® (Deutsche EXXON CHEMICAL GmbH, Cologne, DE) and Shellsol® (Deutsche Shell Chemie GmbH, Eschborn, DE), but also solvents such as propylene glycol diacetate, diethylene glycol dimethyl ether, dipropylene glycol dimethyl ether, diethylene glycol ethyl and butyl ether acetate, N-methylpyrrolidone and N-methylcaprolactam, or any desired mixtures of such solvents.

In one possible embodiment, the polyisocyanates A) having silane and thioallophanate structures may be prepared in such a way that the starting diisocyanate C) or a mixture of various starting diisocyanates is initially charged optionally under inert gas, such as nitrogen, and optionally in the presence of a suitable solvent of the type mentioned at a temperature between 20° C. and 100° C. Subsequently, the mercaptosilane D) or a mixture of various mercaptosilanes is added in the amount stated above and the reaction temperature for the thiourethanization is adjusted optionally by an appropriate measure (heating or cooling) to a temperature of 30° C. to 120° C., preferably of 50° C. to 100° C. Following the thiourethanization reaction, i.e. when the NCO content reached is that corresponding theoretically to complete conversion of isocyanate groups and mercapto groups, the thioallophanatization may be started for example without addition of a catalyst by heating of the reaction mixture to a temperature of 120° C. to 200° C. However, for acceleration of the thioallophanatization reaction, preference is given to using suitable catalysts of the abovementioned type, where, depending on the type and amount of the catalyst used, temperatures in the range of 60° C. to 140° C., preferably 70° C. to 120° C., are sufficient to carry out the reaction.

In another possible embodiment of the preparation of the polyisocyanates A) having silane and thioallophanate structures, the catalyst for optional additional use is admixed either to the diisocyanate component C) and/or to the silane component D) even before the start of the actual reaction. In this case, the thiourethane groups formed as intermediates undergo spontaneous further reaction to give the desired thioallophanate structure. In this kind of one-stage reaction regime, the starting diisocyanates C), optionally containing the catalyst, are initially charged, optionally under inert gas, such as nitrogen, and optionally in the presence of a suitable solvent of the type mentioned, in general at temperatures optimal for the thioallophanatization in the range from 60° C. to 140° C., preferably 70° C. to 120° C., and are reacted with the silane component D) optionally containing the catalyst.

However, it is also possible to add the catalyst to the reaction mixture at any desired time during the thiourethanization reaction. In the case of this embodiment of the preparation of the polyisocyanates A) having silane and thioallophanate structures, the temperature set for the pure thiourethanization reaction, which proceeds before the addition of catalyst, is generally in the range of 30° C. to 120° C., preferably of 50° C. to 100° C. Following addition of a suitable catalyst, the thioallophanatization reaction is finally carried out at temperatures of 60° C. to 140° C., preferably of 70° C. to 120° C.

In the preparation of the polyisocyanates A) having silane and thioallophanate structures, the progress of the reaction can be monitored by determining the NCO content by titrimetric means for example. When the target NCO content has been reached, preferably when the degree of thioallophanatization (i.e. the percentage fraction, computable from the NCO content, of the thiourethane groups which have formed as intermediates from the mercapto groups of component D) and have undergone reaction to form thioallophanate groups) of the reaction mixture is at least 70%, particularly preferably at least 90%, very particularly preferably after complete thioallophanatization, the reaction is discontinued. In the case of a purely thermal reaction regime, this may be effected for example by cooling the reaction mixture to room temperature. However, in the case of the preferred additional use of a thioallophanatization catalyst of the type mentioned, the reaction is generally stopped by addition of suitable catalyst poisons, for example acid chlorides such as benzoyl chloride or isophthaloyl dichloride.

The reaction mixture is preferably then freed from volatile constituents (excess monomeric diisocyanates, any solvents used in addition and, when no catalyst poison is used, any active catalyst) by thin-film distillation under a high vacuum, for example at a pressure of below 1.0 mbar, preferably below 0.5 mbar, particularly preferably below 0.2 mbar, under very gentle conditions, for example at a temperature of 100° C. to 200° C., preferably of 120° C. to 180° C.

The distillates obtained, which in addition to the unconverted monomeric starting diisocyanates contain any solvents used in addition and, when no catalyst poison is used, any active catalyst, can be used readily for renewed oligomerization.

In a further embodiment of the preparation of the polyisocyanates A) having silane and thioallophanate structures, the volatile constituents mentioned are removed from the oligomerization product by extraction with suitable solvents that are inert toward isocyanate groups, for example aliphatic or cycloaliphatic hydrocarbons such as pentane, hexane, heptane, cyclopentane or cyclohexane.

Irrespective of the type of workup, the resulting products are clear, virtually colorless polyisocyanates A) having silane and thioallophanate structures, generally with color numbers of below 120 APHA, preferably of below 80 APHA, particularly preferably of below 60 APHA, and an NCO content of 2.0% to 18.0% by weight, preferably 7.0% to 17.0% by weight, particularly preferably 10.0% to 16.0% by weight. The average NCO functionality, depending on the degree of conversion and the thioallophanatization catalyst used, is generally from 1.8 to 3.0, preferably from 1.8 to 2.5, particularly preferably from 1.9 to 2.0.

In addition to the polyisocyanate component A), the hydrophilically modified polyisocyanates having silane and thioallophanate structures according to the invention comprise at least one ionic and/or nonionic emulsifier B).

These are any desired surface-active substances which, due to their molecular structure, are capable of stabilizing polyisocyanates or polyisocyanate compositions in aqueous emulsions over a relatively long period of time, preferably up to 8 hours.

The hydrophilically modified polyisocyanates having silane and thioallophanate structures according to the invention are prepared by mixing the polyisocyanates A) having silane and thioallophanate structures with the emulsifier component B) or by forming the emulsifier component B) in the polyisocyanate component A) by partial reaction of polyisocyanate molecules of the polyisocyanate component A) with ionic and/or nonionic compounds bearing groups that are reactive toward isocyanate groups.

A preferred type of nonionic emulsifiers B) is represented for example by reaction products B1) of the polyisocyanates A) having silane and thioallophanate structures with hydrophilic polyether alcohols.

Suitable hydrophilic polyether alcohols are mono- or polyhydric polyalkylene oxide polyether alcohols having a statistical average of 5 to 50 ethylene oxide units per molecule, such as those accessible in a manner known per se by alkoxylation of suitable starter molecules (see for example *Ullmanns Encyclopädie der technischen Chemie* [Ullmann's Encyclopedia of Industrial Chemistry], 4th edition, volume 19, Verlag Chemie, Weinheim pp. 31-38). Such starter molecules may for example be any desired mono- or polyhydric alcohols of the molecular weight range 32 to 300, such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methylcyclohexanols, hydroxymethylcyclohexane, 3-methyl-3-hydroxymethyloxetane, benzyl alcohol, phenol, the isomeric cresols, octylphenols, nonylphenols and naphthols, furfuryl alcohol, tetrahydrofurfuryl alcohol, ethane-1,2-diol, propane-1,2- and -1,3-diol, the isomeric butanediols, pentanediols, hexanediols, heptanediols and octanediols, cyclohexane-1,2- and -1,4-diol, cyclohexane-1,4-dimethanol, 4,4'-(1-methylethylidene)biscyclohexanol, propane-1,2,3-triol, 1,1,1-trimethylolethane, hexane-1,2,6-triol, 1,1,1-trimethylolpropane, 2,2-bis(hydroxymethyl)propane-1,3-diol or 1,3,5-tris(2-hydroxyethyl) isocyanurate.

Alkylene oxides suitable for the alkoxylation reaction are in particular ethylene oxide and propylene oxide, which may be used in the alkoxylation reaction in any desired order or else in a mixture. Suitable polyether alcohols are either pure polyethylene oxide polyether alcohols or mixed polyalkylene oxide polyethers, the alkylene oxide units of which consist to an extent of at least 70 mol %, preferably to an extent of at least 80 mol %, of ethylene oxide units.

Preferred polyalkylene oxide polyether alcohols are those which have been prepared using the abovementioned monoalcohols of the molecular weight range 32 to 150 as starter molecules. Particularly preferred polyether alcohols are pure polyethylene glycol monomethyl ether alcohols having a statistical average of 5 to 50, very particularly preferably 5 to 25, ethylene oxide units.

The preparation of such preferred nonionic emulsifiers B1) is known in principle and described for example in EP-B 0 206 059 and EP-B 0 540 985.

Said preparation may be effected by reacting the polyisocyanates A) having silane and thioallophanate structures with the polyether alcohols mentioned either in a separate reaction step with subsequent mixing of the resulting emulsifier B1) with the polyisocyanate components A) to be converted to a hydrophilic form or else in such a way that the polyisocyanate components A) are mixed with an appropriate amount of the polyether alcohols, where a hydrophilic polyisocyanate mixture according to the invention is spontaneously formed which, in addition to unreacted polyisocyanate A) having silane and thioallophanate structures, comprises the emulsifier B1) which forms in situ from the polyether alcohol and some of component A).

This type of nonionic emulsifiers B1) is generally prepared at temperatures of 40° C. to 180° C., preferably 50° C. to 150° C., observing an NCO/OH equivalents ratio of 2:1 to 400:1, preferably of 4:1 to 140:1.

In the first-mentioned variant of the separate preparation of the nonionic emulsifiers B1), these are preferably prepared observing an NCO/OH equivalents ratio of 2:1 to 6:1. In the in situ preparation of the emulsifiers B1), it is obviously possible to use a large excess of isocyanate groups within the broad range mentioned above.

The reaction of the polyisocyanates A) having silane and thioallophanate structures with the hydrophilic polyether alcohols mentioned to give nonionic emulsifiers B1) may also be carried out according to the process described in EP-B 0 959 087 in such a way that the urethane groups primarily formed by NCO/OH reaction are further converted, at least partially, preferably to an extent of at least 60 mol %, to allophanate groups, based on the sum of urethane and allophanate groups. In this case, the coreactants are reacted in the abovementioned NCO/OH equivalents ratio at temperatures of 40° C. to 180° C., preferably 50° C. to 150° C., generally in the presence of the catalysts suitable for accelerating the allophanatization reaction, as indicated in the cited patent specifications, in particular zinc compounds, such as zinc(II) n-octanoate, zinc(II) 2-ethyl-1-hexanoate or zinc(II) stearate.

Another preferred type of suitable nonionic emulsifiers B) is represented for example also by reaction products of monomeric diisocyanates or diisocyanate mixtures with the abovementioned mono- or polyhydric hydrophilic polyether alcohols in an OH/NCO equivalents ratio of 0.6:1 to 1.2:1. Particular preference is given to the reaction of monomeric diisocyanates or diisocyanate mixtures with pure polyethylene glycol monomethyl ether alcohols having a statistical average of 5 to 50, preferably 5 to 25, ethylene oxide units. The preparation of such emulsifiers B2) is likewise known and described for example in EP-B 0 486 881.

Optionally, however, the emulsifiers B2) may also be reacted with the polyisocyanates A) having silane and thioallophanate structures with allophanatization in the presence of suitable catalysts after the components have been mixed in the ratios described above. This also produces hydrophilic polyisocyanate compositions which, in addition to unreacted polyisocyanate A), comprise a further nonionic emulsifier type B3) with an allophanate structure which forms in situ from the emulsifier B2) and some of component A). The in situ preparation of such emulsifiers B3) is also already known and described for example in WO 2005/047357.

Instead of the nonionic emulsifiers described by way of example, the hydrophilically modified polyisocyanates having silane and thioallophanate structures according to the invention may also comprise emulsifiers with ionic, in particular anionic, groups.

These ionic emulsifier components B) are in particular reaction products of at least one polyisocyanate molecule of the polyisocyanates A) having silane and thioallophanate structures with an aminosulfonic acid.

Such ionic emulsifiers B) are preferably sulfonate group-containing emulsifiers B4), such as those obtainable for example by the process of WO 01/88006 by reacting the polyisocyanate components A) with 2-(cyclohexylamino)ethanesulfonic acid and/or 3-(cyclohexylamino)propanesulfonic acid or else with 4-(cyclohexylamino)butanesulfonic acid. This reaction generally takes place at temperatures of 40° C. to 150° C., preferably 50° C. to 130° C., observing an equivalents ratio of NCO groups to amino groups of 2:1 to 400:1, preferably of 4:1 to 250:1, where tertiary amines are additionally used, preferably in an equimolar amount based on the amount of aminosulfonic acid, for neutralization of the sulfonic acid groups. Suitable neutralizing amines are for example tertiary monoamines, such as trimethylamine, triethylamine, tripropylamine, tributylamine, dimethylcyclohexylamine, diisopropylethylamine, N-methylmorpholine, N-ethylmorpholine, N-methylpiperidine or N-ethylpiperidine, tertiary diamines, such as 1,3-bis(dimethylamino)propane, 1,4-bis(dimethylamino)butane or N,N'-dimethylpiperazine, or, although less preferred, alkanolamines, such as dimethylethanolamine, methyldiethanolamine or triethanolamine.

As already described for the nonionic emulsifiers B1), the polyisocyanates A) having silane and thioallophanate structures may also be reacted with the aminosulfonic acids mentioned either in a separate reaction step with subsequent mixing of the resulting ionic emulsifiers B4) with the polyisocyanate components A) to be converted to a hydrophilic form or else in situ in these polyisocyanate components, where a hydrophilically modified polyisocyanate having silane and thioallophanate structures according to the invention is directly formed which, in addition to unreacted polyisocyanate A), comprises the emulsifier B4) which forms in situ from the aminosulfonic acids, the neutralizing amine and some of components A).

Another preferred type of suitable emulsifiers B) are those which simultaneously comprise ionic and nonionic structures in one molecule. These emulsifiers B5) are for example alkylphenol polyglycol ether phosphates and phosphonates or fatty alcohol polyglycol ether phosphates and phosphonates neutralized with tertiary amines, such as the neutralizing amines mentioned above, such as those described for example in WO 97/31960 for the hydrophilization of polyisocyanates, or else alkylphenol polyglycol ether sulfates or fatty alcohol polyglycol ether sulfates neutralized with such tertiary amines.

In this case, the emulsifier component preferably comprises at least one alkali metal salt or ammonium salt of an alkylphenol polyglycol ether phosphate, alkylphenol polyglycol ether phosphonate, fatty alcohol polyglycol ether phosphate, fatty alcohol polyglycol ether phosphonate, alkylphenol polyglycol ether sulfate and/or fatty alcohol polyglycol ether sulfate.

Irrespective of the type of the emulsifier B) and the preparation thereof, the amount thereof or the amount of the ionic and/or nonionic components added to the polyisocyanates A) during an in situ preparation of the emulsifier is generally measured such that the hydrophilically modified polyisocyanates having silane and thioallophanate structures according to the invention ultimately obtained comprise an amount of emulsifier B) which ensures the dispersibility of the polyisocyanate mixture.

The preparation of the polyisocyanates A) having silane and thioallophanate structures and of the hydrophilically modified polyisocyanates according to the invention having silane and thioallophanate structures and consisting of at least one ionic and/or nonionic emulsifier B) may be effected without a solvent or optionally in a suitable solvent that is inert toward isocyanate groups, for example those described above as being suitable for the thioallophanatization in the preparation of the polyisocyanate component A).

In a further preferred embodiment, the invention relates to hydrophilic polyisocyanate compositions comprising a polyisocyanate component A) and an emulsifier component B), characterized in that the polyisocyanate component A) consists of at least one polyisocyanate having silane and thioallophanate structures of the general formula (I)

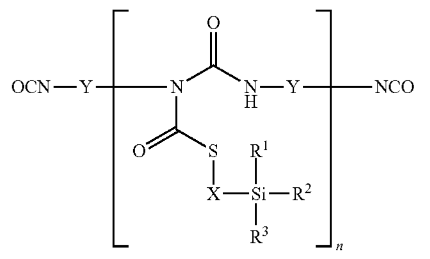

(I)

in which $R^1$, $R^2$ and $R^3$ are identical or different radicals and are each a saturated, linear or branched, aliphatic or cycloaliphatic radical having up to 6 carbon atoms, which may optionally contain up to 3 oxygen atoms, and X is a linear or branched alkylene radical having 2 to 10 carbon atoms Y is a linear or branched, aliphatic or cycloaliphatic radical having 4 to 18 carbon atoms or an optionally substituted aromatic or araliphatic radical having 6 to 18 carbon atoms and n is an integer from 1 to 20, and the emulsifier component B) comprises at least one ionic and/or nonionic emulsifier.

Also preferably, the invention relates to hydrophilic polyisocyanate compositions comprising a polyisocyanate component A) and an emulsifier component B), characterized in that the polyisocyanate component A) consists of at least one polyisocyanate having silane and thioallophanate structures of the general formula (I)

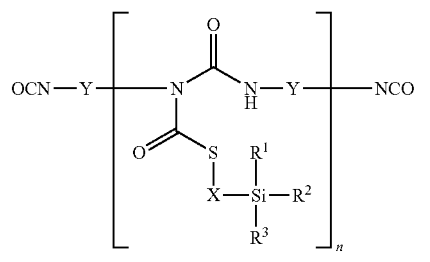

(I)

in which $R^1$, $R^2$ and $R^3$ are each alkyl radicals having up to 6 carbon atoms and/or alkoxy radicals containing up to 3 oxygen atoms, with the proviso that at least one of the radicals $R^1$, $R^2$ and $R^3$ is such an alkoxy radical, and X is a propylene radical ($—CH_2—CH_2—CH_2—$)

Y is a linear or branched, aliphatic or cycloaliphatic radical having 5 to 13 carbon atoms and n is an integer from 1 to 20, and the emulsifier component B) comprises at least one ionic and/or nonionic emulsifier.

Also preferably, the invention relates to hydrophilic polyisocyanate compositions comprising a polyisocyanate component A) and an emulsifier component B), characterized in that the polyisocyanate component A) consists of at least one polyisocyanate having silane and thioallophanate structures of the general formula (I)

(I)

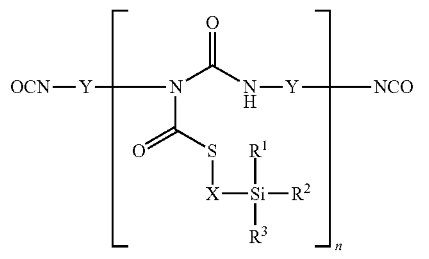

in which $R^1$, $R^2$ and $R^3$ are identical or different radicals and are each methyl, methoxy or ethoxy, with the proviso that at least one of the radicals $R^1$, $R^2$ and $R^3$ is a methoxy or ethoxy radical, and X is a propylene radical ($—CH_2—CH_2—CH_2—$)

Y is pentane-1,5-diyl, hexane-1,6-diyl, 3,3,5-trimethylcyclohexane-5-methylen-1-yl, dicyclohexylmethane-2,4'-diyl and/or dicyclohexylmethane-4,4'-diyl or any desired mixtures of these radicals and n is an integer from 1 to 20, and the emulsifier component B) comprises at least one ionic and/or nonionic emulsifier.

The hydrophilically modified polyisocyanates having silane and thioallophanate structures according to the invention are valuable starting materials for the production of polyurethane plastics by the isocyanate polyaddition process.

For this purpose, the polyisocyanates are preferably used in the form of aqueous emulsions which can be reacted in combination with polyhydroxyl compounds dispersed in water in the context of aqueous two-component systems.

Particularly preferably, the hydrophilically modified polyisocyanates having silane and thioallophanate structures according to the invention are used as crosslinkers for paint or adhesive binders or binder components that are dissolved or dispersed in water and have groups that are reactive toward isocyanate groups, particularly alcoholic hydroxyl groups, in the production of coatings using aqueous coating compositions based on such binders or binder components. The crosslinker, optionally in emulsified form, can be combined with the binders or binder components here by simple stirring, before the coating composition is processed, using any desired method or else using two-component spray guns.

In this context, examples of suitable paint or adhesive binders or binder components for combination with the hydrophilically modified polyisocyanates having silane and thioallophanate structures according to the invention are: polyacrylate polyols dissolved or dispersed in water, particularly those of the molecular weight range 1000 to 20 000, hydroxy-functional polyacrylate/polyurethane and polyester/polyurethane hybrid dispersions, hydroxy-functional polyurethane/polyurea dispersions, polyester polyol dispersions or optionally urethane-modified polyester resins of the type known from polyester and alkyd resin chemistry that have hydroxyl groups and are dispersed in water. In principle, all binders that have isocyanate-reactive groups and are dissolved or dispersed in water are suitable as coreactants for the polyisocyanate mixtures according to the invention. These also include, for example, hydroxyl group-free polyurethanes and/or polyureas that are dispersed in water and are crosslinkable with polyisocyanates on account of the active hydrogen atoms present in the urethane or urea groups.

The present invention further provides a coating composition comprising at least one hydrophilically modified polyisocyanate having silane and thioallophanate structures.

When used according to the invention as a crosslinker component for aqueous paint or adhesive binders, the hydrophilically modified polyisocyanates having silane and thioallophanate structures according to the invention are generally used in such amounts that correspond to an equivalents ratio of NCO groups to groups that are reactive toward NCO groups, particularly alcoholic hydroxyl groups, of 0.5:1 to 2.5:1, preferably 0.7:1 to 2.0:1.

The hydrophilically modified polyisocyanates having silane and thioallophanate structures according to the invention may optionally also be admixed in minor amounts to non-functional aqueous binders in order to achieve very specific properties, for example as an additive for improving adhesion. In this case, the hydrophilically modified polyisocyanates having silane and thioallophanate structures are generally used in an amount of 1% to 30% by weight, preferably 3% to 20% by weight, particularly preferably 5% to 15% by weight, based on the total amount of polyisocyanate and binder used.

It is of course also possible to use the hydrophilically modified polyisocyanates having silane and thioallophanate structures according to the invention in a form blocked with blocking agents known per se from polyurethane chemistry in combination with the abovementioned aqueous binders or binder components in the context of aqueous one-component PUR baking systems.

Suitable blocking agents are for example diethyl malonate, ethyl acetoacetate, acetone oxime, butanone oxime, ¿-caprolactam, diisopropylamine, 3,5-dimethylpyrazole, 1,2,4-triazole, dimethyl-1,2,4-triazole, imidazole or any desired mixtures of any of these blocking agents.

Useful substrates for the aqueous coatings formulated using the sulfonate group-containing polyisocyanate mixtures according to the invention are any desired substrates, such as metal, wood, glass, stone, ceramic materials, concrete, rigid and flexible plastics, textiles, leather and paper, which may optionally also be provided with customary primers prior to coating.

In general, the aqueous coating compositions formulated with the hydrophilically modified polyisocyanates having silane and thioallophanate structures according to the invention, to which coating compositions it is optionally possible to add the customary auxiliaries and additives, such as leveling aids, light stabilizers, antioxidants, defoamers, wetting agents, anti-settling agents, thickeners, dyes, pigments, fillers, matting agents, plasticizers, catalysts or auxiliary solvents, have good performance properties even when dried at room temperature.

However, they may of course also be dried under forced conditions at elevated temperature or by baking at temperatures up to 260° C.

The present invention further provides a substrate coated with a coating composition according to the invention that has optionally been cured under the action of heat.

As a crosslinker component in aqueous coating systems, the hydrophilically modified polyisocyanates having silane and thioallophanate structures according to the invention offer considerable advantages in comparison with the hydrophilic, alkoxysilane group-containing polyisocyanates from the prior art that are known to date, in particular with respect to the adhesion that can be achieved. This fact is particularly surprising because the hydrophilic polyisocyanates according to the invention generally have significantly lower isocyanate functionalities of often <2.

Due to their excellent adhesion properties, aqueous coating systems formulated with the hydrophilically modified polyisocyanates having silane and thioallophanate structures according to the invention are also particularly suitable for the adhesive bonding of different materials, such as wood, metal, plastic, paper, textile, ceramic, glass or stone.

The aqueous polyurethane dispersion adhesives thus formulated are particularly suitable for the adhesive bonding of different materials in the production of multilayer composites, particularly of multilayer composites having at least one metal foil, such as those used for example for the packaging of food. Said adhesives result in high heat resistance of the adhesive bond and high bond strengths which, in comparison with adhesive bonds produced using, as crosslinkers, the hydrophilic, alkoxysilane group-containing polyisocyanates from the prior art that are known to date, are not only maintained under the conditions of hot sterilization but even improved significantly.

The features specified as preferred for the polyisocyanate mixture according to the invention are also preferred for the further subjects of the invention.

The examples which follow serve to illustrate the present invention, but should in no way be understood as imposing any restriction on the scope of protection.

EXAMPLES

All percentages are based on weight, unless stated otherwise.

NCO contents were determined titrimetrically in accordance with DIN EN ISO 11909:2007-05.

All viscosity measurements were performed with a Physica MCR 51 rheometer from Anton Paar Germany GmbH (DE) in accordance with DIN EN ISO 3219:1994-10 at a shear rate of 250 $s^{-1}$.

Residual monomer contents were measured in accordance with DIN EN ISO 10283:2007-11 by gas chromatography with an internal standard.

The contents (mol %) of the thiourethane, thioallophanate and isocyanurate present in the polyisocyanate A) having silane and thioallophanate structures were calculated from the integrals of proton-decoupled $^{13}C$ NMR spectra (recorded on a Bruker DPX-400 instrument) and are based in each case on the sum of thiourethane, thioallophanate and isocyanurate groups present. The individual structural elements have the following chemical shifts (in ppm) measured in $CDCl_3$: thiourethane: 166.8; thioallophanate: 172.3 and 152.8; isocyanurate: 148.4.

Bond strength was determined using a universal tester from FRANK-PTI GmbH (DE). For this purpose, the test specimens were clamped in the clamping jaws of the tensile testing machine in such a way that the canvas fabric was able to be pulled off from the aluminum plate at a 180° angle. The aluminum plate was clamped in the upper clamping jaw and the end of the protruding canvas fabric strip was clamped in the lower clamping jaw. The tensile test was carried out at a pull-off speed of 100 mm/min.

Starting Compounds

Polyisocyanate A) Having Silane and Thioallophanate Structures 756 g (4.5 mol) of hexamethylene diisocyanate (HDI) was initially charged under dry nitrogen with stirring at a temperature of 80° C. and admixed with 0.1 g of zinc (II) 2-ethyl-1-hexanoate as catalyst. Over a period of about 30 minutes, 294 g (1.5 mol) of mercaptopropyltrimethoxysilane was added dropwise, with the temperature of the mixture increasing to 85° C. owing to the exothermic reaction that set in. The reaction mixture was stirred further at 85° C. until, after about 2 h, the NCO content had dropped to 24.0%. The catalyst was deactivated by addition of 0.1 g of orthophosphoric acid and the unreacted monomeric HDI was removed in a thin-film evaporator at a temperature of 130° C. and a pressure of 0.1 mbar.

This gave 523 g of a virtually colorless, clear polyisocyanate having silane and thioallophanate structures, which had the following characteristics and composition:

NCO content: 11.8%
Monomeric HDI: 0.06%
Viscosity (23° C.): 450 mPas
NCO functionality: 2.0
Thiourethane: 0.0 mol %
Thioallophanate: 99.0 mol %
Isocyanurate groups: 1.0 mol %

Polyurethane Dispersions

Dispercoll U 42: Aqueous dispersion of an amorphous anionically modified polyurethane based on polyester polyol; nonvolatile fraction 50%
(Covestro Deutschland AG, Leverkusen; DE)

Dispercoll U XP 2643: Aqueous dispersion of an amorphous anionically modified polyurethane based on polyether polyol; nonvolatile fraction 40%
(Covestro Deutschland AG, Leverkusen; DE)

Example 1 (According to the Invention)

Hydrophilically Modified Polyisocyanate Having Silane and Thioallophanate Structures, Emulsifier Type B1)

900 g (2.53 eq) of polyisocyanate A) having silane and thioallophanate structures described above was initially charged under dry nitrogen with stirring at 80° C., admixed over the course of 30 min with 100 g (0.20 eq) of a methanol-initiated, monofunctional polyethylene oxide polyether having an average molecular weight of 500 and stirred further at this temperature until, after about 4 h, the NCO content of the mixture had fallen to a value of 9.8%. After cooling to room temperature, there was a colorless, clear polyisocyanate mixture having the following characteristics:

NCO content: 9.8%
Monomeric HDI: 0.05%
Viscosity (23° C.): 500 mPas
NCO functionality: 1.8

Example 2 (According to the Invention)

Hydrophilically Modified Polyisocyanate Having Silane and Thioallophanate Structures, Emulsifier Type B4)

980 g (2.53 eq) of polyisocyanate A) having silane and thioallophanate structures described above was admixed with 20 g (0.09 eq) of 3-(cyclohexylamino) propanesulfonic acid, 11.5 g (0.09 eq) of dimethylcyclohexylamine and 0.2 g (200 ppm) of 2,6-di-tert-butyl-4-methylphenol (ionol) under dry nitrogen with stirring at 80° C. and stirred further at this temperature until, after about 3 h, the NCO content of the mixture had fallen to a value of 11.0%. After cooling to room temperature, there was a colorless, clear polyisocyanate mixture having the following characteristics:

NCO content: 11.0%
Monomeric HDI: 0.06%
Viscosity (23° C.): 640 mPas
NCO functionality: 1.9

Example 3 (Comparative)

Hydrophilically Modified Polyisocyanate Having Silane Structures in Accordance with EP 1 544 226, Example 2

690.3 g (3.58 eq) of Desmodur® N 3400 (polyisocyanate based on HDI, NCO content: 21.8%, viscosity (23° C.): 170 mPas; manufacturer: Covestro Deutschland AG) was initially charged under dry nitrogen with stirring at 45° C., admixed over the course of 20 min with 122 g (0.22 eq) of a methanol-initiated, monofunctional polyethylene oxide polyether having an average molecular weight of 550 and stirred further at this temperature until, after about 6 h, the NCO content of the mixture had fallen to a value of 17.3%. Subsequently, 171 g (0.49 eq) of a silane-functional aspartate prepared in accordance with Example 1 of EP 1 544 226 (addition product of 3-aminopropyltrimethoxysilane with diethyl maleate) was added in such a way that the temperature of the reaction mixture did not exceed 50° C. despite the exothermicity that set in. After a reaction time of 2 h at 50° C. and cooling to room temperature, there was a colorless, clear polyisocyanate mixture having the following characteristics:

NCO content: 12.2%
Monomeric HDI: 0.11%
Viscosity (23° C.): 680 mPas
NCO functionality: 2.4

Example 4 (Comparative)

Hydrophilically Modified Polyisocyanate Having Silane Structures in Accordance with EP 953 585, Example G 855 g (4.68 eq) of an isocyanurate group-containing polyisocyanate based on HDI having an NCO content of 23.0% and a viscosity (23° C.) of 1200 mPas was initially charged under dry nitrogen with stirring at 70° C., admixed over the course of 20 min with 119 g (0.22 eq) of a methanol-initiated, monofunctional polyethylene oxide polyether having an average molecular weight of 550 and 26 g (0.13 eq) of mercaptopropyltrimethoxysilane and then stirred further for 3 h at 80° C. After cooling to room temperature and addition of 5 g of γ-glycidyloxypropyltrimethoxysilane, there was a colorless, clear polyisocyanate mixture having the following characteristics:

NCO content: 17.2%

Monomeric HDI: 0.08%

Viscosity (23° C.): 770 mPas

NCO functionality: 3.0

Examples 5 to 10 (According to the Invention and Comparative)

To produce aqueous two-component coating compositions for use as adhesive, the polyisocyanates from Example 1 to 4 were added to the abovementioned aqueous polyurethane dispersions and the mixtures were each homogenized by stirring for 5 minutes by hand.

The dispersion adhesives thus obtained were applied to aluminum plates (W×D×H=50 mm×120 mm×1.7 mm) and to canvas fabric strips (30 mm×240 mm) using a brush. The canvas fabric strips coated with dispersion adhesive were then placed in the dispersion layer on the aluminum plate in such a way that the canvas fabric strips protruded 120 mm over the aluminum plate. The adhesive layer was dried at 23° C./50% rel. humidity, with the water evaporating through the canvas fabric.

After storage for one week under standard conditions, in each case half of the adhesive composites (per adhesive dispersion) were sterilized in a Varioklav VI 400 EC sterilizer (HP Labortechnik GmbH, Oberschleißheim, DE) at 121° C. for 30 minutes in accordance with the operating instructions. After removal from the sterilizer, the samples were dried at 23° C./50% rel. humidity for 24 hours.

The adhesive composites were then tested with regard to bond strength. Table 1 below shows the compositions of the dispersion adhesives in parts by weight and the bond strengths of the adhesive composites before and after steam sterilization each as an average of five individual measurements.

TABLE 1

| | 5 | 6 | 7 | 8 | 9 (comparative) | 10 (comparative) |
|---|---|---|---|---|---|---|
| Dispercoll U 42 | 100 | 100 | | | | |
| Dispercoll U XP 2643 | | | 100 | 100 | 100 | 100 |
| Polyisocyanate from Example 1 | 6 | | 6 | | | |
| Polyisocyanate from Example 2 | | 6 | | 6 | | |
| Polyisocyanate from Example 3 | | | | | 6 | |
| Polyisocyanate from Example 4 | | | | | | 6 |
| Bond strength before sterilization [N/mm] | 0.52 | 0.41 | 0.29 | 0.34 | 0.20 | 0.24 |
| Bond strength after sterilization [N/mm] | 0.55 | 0.66 | 0.48 | 1.53 | 0.18 | 0.33 |
| Change in bond strength [%] | 6 | 61 | 66 | 350 | −10 | 38 |

Examples 5 to 8 according to the invention show that the bond strength of the multilayer composites produced using hydrophilically modified polyisocyanates having silane and thioallophanate structures is increased in all cases under sterilization conditions.

The comparison of Examples 7 and 8 with Comparative Examples 9 and 10 shows that in the case of adhesive composites obtained using the polyisocyanates according to the invention, there is a significant increase in the bond strength (Examples 7 and 8 according to the invention) as a result of the sterilization, while the use of the hydrophilically modified polyisocyanates having silane structures from the prior art (Comparative Examples 9 and 10) only results in a very small increase or in a decrease in strength.

The invention claimed is:

1. A hydrophilic polyisocyanate composition comprising a polyisocyanate component A) and an emulsifier component B), wherein the polyisocyanate component A) consists of at least one polyisocyanate having silane and thioallophanate structures of the general formula (I)

(I)

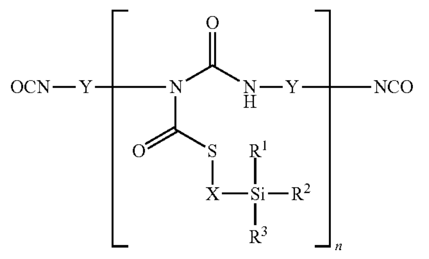

in which $R^1$, $R^2$ and $R^3$ are identical or different radicals and are each a saturated or unsaturated, linear or branched, aliphatic or cycloaliphatic or an optionally substituted aromatic or araliphatic radical having up to 18 carbon atoms, which may optionally contain up to 3 heteroatoms from the series of oxygen, sulfur and nitrogen, X is a linear or branched organic radical having at least 2 carbon atoms, Y is a linear or branched, aliphatic or cycloaliphatic, an araliphatic or aromatic radical having up to 18 carbon atoms and n is an integer from 1 to 20, and the emulsifier component B) comprises at least one ionic and/or nonionic emulsifier which is the reaction product of at least one polyisocyanate having silane and thioallophanate structures of the general formula (I) with ionic and/or nonionic compounds bearing groups that are reactive toward isocyanate groups.

2. The hydrophilic polyisocyanate composition as claimed in claim 1, wherein the polyisocyanate component A) is prepared by reacting C) at least one monomeric diisocyanate of the general formula (II)

(IV)

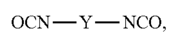

in which Y is a linear or branched, aliphatic or cycloaliphatic, an araliphatic or aromatic radical having up to 18 carbon atoms, with D) mercaptosilanes of the general formula (III)

(III)

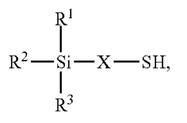

in which $R^1$, $R^2$, $R^3$ are identical or different radicals and are each a saturated or unsaturated, linear or branched, aliphatic or cycloaliphatic or an optionally substituted aromatic or araliphatic radical having up to 18 carbon atoms, which may optionally contain up to 3 heteroatoms from the series of oxygen, sulfur and nitrogen, and X is a linear or branched organic radical having at least 2 carbon atoms, in an equivalents ratio of isocyanate groups to mercapto groups of 2:1 to 40:1.

3. The hydrophilic polyisocyanate composition as claimed in claim 2, wherein the monomeric diisocyanate C) of the general formula (II) is 1,5-diisocyanatopentane, 1,6-diisocyanatohexane, 1-isocyanato-3,3,5-trimethyl-5-isocyanatomethylcyclohexane, 2,4'- and/or 4,4'-diisocyanatodicyclohexylmethane or any desired mixtures of these diisocyanates.

4. The hydrophilic polyisocyanate composition as claimed in claim 2, wherein the mercaptosilanes D) of the general formula (III)

(III)

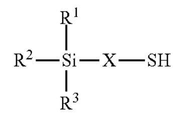

are those in which $R^1$, $R^2$ and $R^3$ are identical or different radicals and are each a saturated, linear or branched, aliphatic or cycloaliphatic radical that has up to 6 carbon atoms and may optionally comprise up to 3 oxygen atoms, X is a linear or branched alkylene radical having 2 to 10 carbon atoms.

5. The hydrophilic polyisocyanate composition as claimed in claim 4, wherein in the mercaptosilanes D) of the general formula (III):

$R^1$, $R^2$ and $R^3$ are identical or different radicals and are each alkyl radicals having up to 6 carbon atoms or alkoxy radicals containing up to 3 oxygen atoms, with the proviso that at least one of the radicals is the alkoxy radical containing up to 3 oxygen atoms, and X is a propylene radical ($-CH_2-CH_2-CH_2-$).

6. The hydrophilic polyisocyanate composition as claimed in claim 4, wherein in the mercaptosilanes D) of the general formula (III):

$R^1$, $R^2$ and $R^3$ are identical or different radicals and are each methyl, methoxy or ethoxy, with the proviso that at least one of the radicals $R^1$, $R^2$ and $R^3$ is a methoxy or ethoxy, and X is a propylene radical ($-CH_2-CH_2-CH_2-$).

7. The hydrophilic polyisocyanate composition as claimed in claim 1, wherein the polyisocyanate component A) has an NCO content of 2.0% to 18.0% by weight and/or an average NCO functionality of 1.8 to 3.0.

8. The hydrophilic polyisocyanate composition as claimed in claim 1, wherein the emulsifier component B) comprises at least one reaction product of at least one polyisocyanate of the polyisocyanate component A) with a hydrophilic polyether alcohol.

9. The hydrophilic polyisocyanate composition as claimed in claim 8, wherein the hydrophilic polyether alcohol is a polyethylene glycol monomethyl ether alcohol containing a statistical average of 5 to 50 ethylene oxide units.

10. The hydrophilic polyisocyanate composition as claimed in claim 1, wherein the emulsifier component B) comprises at least one reaction product of at least one polyisocyanate of the polyisocyanate component A) with an aminosulfonic acid.

11. The hydrophilic polyisocyanate composition as claimed in claim 10, wherein the aminosulfonic acid is selected from the group of 2-(cyclohexylamino)ethanesulfonic acid, 3-(cyclohexylamino)propanesulfonic acid and/or 4-(cyclohexylamino)butanesulfonic acid.

12. The hydrophilic polyisocyanate composition as claimed in claim 1, wherein the emulsifier component B) comprises at least one alkali metal salt or ammonium salt of an alkylphenol polyglycol ether phosphate, alkylphenol polyglycol ether phosphonate, fatty alcohol polyglycol ether phosphate, fatty alcohol polyglycol ether phosphonate, alkylphenol polyglycol ether sulfate and/or fatty alcohol polyglycol ether sulfate.

13. A process for preparing the hydrophilic polyisocyanate composition as claimed in claim 1, wherein the polyisocyanate component A) is mixed with the emulsifier component B) or the emulsifier component B) is formed in the polyisocyanate component A) by partial reaction of polyisocyanates of the polyisocyanate component A) with ionic and/or nonionic compounds bearing groups that are reactive toward isocyanate groups.

14. A method for producing polyurethane plastics comprising providing the hydrophilic polyisocyanate composition as claimed in claim 1.

15. A coating composition comprising at least one hydrophilic polyisocyanate composition as claimed in claim 1 and at least one compound that is reactive toward isocyanate groups, and optionally further auxiliaries and additives.

16. A coating formed by applying a coating composition as claimed in claim 15 to a surface.

17. A method for the adhesive bonding of same or different materials comprising providing a coating composition as claimed in claim 15.

18. The method as claimed in claim 17, wherein the adhesive bonding produces multilayer composites having at least one metal foil.

* * * * *